(12) United States Patent
Rieck

(10) Patent No.: US 6,427,974 B1
(45) Date of Patent: Aug. 6, 2002

(54) VALVE WITH MANUAL ACTIVATION

(75) Inventor: Frank Rieck, Burgdorf (DE)

(73) Assignee: Mass Magnet GmbH, Hannover (DE)

( * ) Notice: Subject to any disclaimer, the term of this patent is extended or adjusted under 35 U.S.C. 154(b) by 0 days.

(21) Appl. No.: 09/680,518

(22) Filed: Oct. 7, 2000

(30) Foreign Application Priority Data

Oct. 13, 1999 (DE) .......................... 199 49 361

(51) Int. Cl.⁷ .............................................. F16K 51/00
(52) U.S. Cl. ...................................... 251/263; 251/284
(58) Field of Search ............................... 251/263, 251, 251/284

(56) References Cited

U.S. PATENT DOCUMENTS

| | | | | |
|---|---|---|---|---|
| 1,048,825 A | * | 12/1912 | Griffiths | 251/263 X |
| 2,499,318 A | * | 2/1950 | Jungerhans | 251/263 X |
| 2,550,379 A | * | 4/1951 | Rapisarda | 251/263 X |
| 2,869,582 A | * | 1/1959 | Skipwith, Jr. | 251/263 X |
| 2,919,101 A | * | 12/1959 | Black | 251/284 X |
| 5,588,634 A | * | 12/1996 | Nettekoven | 251/263 X |

* cited by examiner

Primary Examiner—Lesley D. Morris
Assistant Examiner—John Bastianelli
(74) Attorney, Agent, or Firm—Muramatsu & Associates

(57) ABSTRACT

A valve with a small construction space. The valve has a valve element, arranged in a valve housing, and a manual activation device which has an activation element which is arranged movably in a recess of the valve housing and which is actively connected to the valve element for the manual activation of the valve element. The activation element is securely retained in the recess of the valve housing by a rigid projection and a stop region which co-operates with the projection. The rigid projection is radially projected and integrally formed either on the activation element or the valve housing and the stop region is formed vice versa on the valve housing or the activation element. Between the recess and the activation element, a sealing element is provided which is of such resilient form that the activation element can be introduced eccentrically into the recess during assembly and is automatically centred in the recess after the assembly.

14 Claims, 3 Drawing Sheets

VALVE WITH MANUAL ACTIVATION

FIELD OF THE INVENTION

The invention relates to a valve having a valve element, arranged in a valve housing, and a manual activation device for the manual activation of the valve element.

BACKGROUND OF THE INVENTION

The valve element is usually activated electrically or electromagnetically in valves of that type. The manual activation of the valve element is then primarily used to check the valve or during start procedures.

Valves having a valve element, arranged in a valve housing, and a manual activation device are known from practice, the manual activation device having an activation element which is arranged movably in a recess of the valve housing and which is actively connected to the valve element for the manual activation of the valve element and, furthermore, there being provided means for securing the activation element in the recess of the valve housing so that the activation element is not pressed out by the operating pressure present inside the valve.

The means for securing the activation element in the recess of the valve housing are formed, for example, in the manner of a bayonet closure. However, that method is relatively complex to produce. Another known solution provides for the use of a cylindrical pin which has to be introduced transversely to the activation element once the activation element has been introduced. Although that solution is relatively simple to effect, it requires additional constructional space, which, furthermore, also has to be accessible, for the fitting of the cylindrical pin.

SUMMARY OF THE INVENTION

Therefore, the problem addressed by the invention is to provide a valve having a manual activation device which is characterized by a small constructional space and thereby being particularly suitable for valves of very small dimensions.

According to the invention, the valve has a valve element, arranged in a valve housing, and a manual activation device, the manual activation device having an activation element which is arranged movably in a recess of the valve housing and which is actively connected to the valve element for the manual activation of the valve element and, furthermore, means being provided for securing the activation element in the recess of the valve housing. The securing means are formed by a rigid projection and a stop region, which co-operates with the projection, the projection being fixed to the activation element or fixed to the valve housing and the stop region accordingly fixed to the other part.

There is further provided, between the recess and the activation element, a sealing element which can be deformed in such a manner that the activation element can be introduced eccentrically into the recess during assembly and is automatically centered in the recess in the introduced state.

In a preferred embodiment, the recess in the valve housing is in the form of a drilled hole and the activation element accordingly pin-shaped, the projection being provided on the outer peripheral face of the activation element and the diameter of the activation element in the region of the projection being equal to or smaller than the diameter of the recess.

BRIEF DESCRIPTION OF THE DRAWINGS

Further embodiments and advantages are explained in greater detail by means of the description of an embodiment and with reference to the drawings, in which.

DETAILED DESCRIPTION OF THE INVENTION

Figure 1:
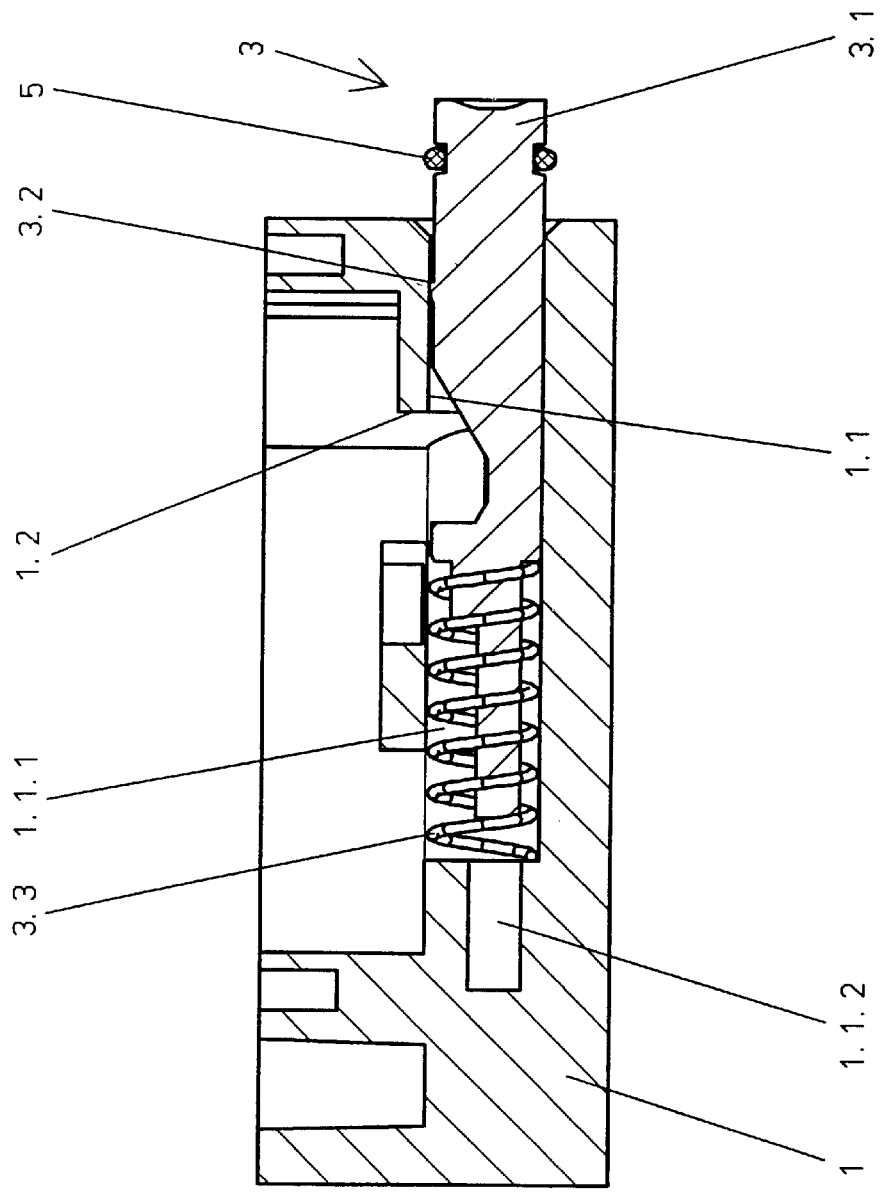
FIG. 1 is a section of the valve in the region of the activation device during assembly.

The valve substantially comprises a valve housing 1 and a valve element 2, arranged in the valve housing, and a manual activation device 3.

The valve is, for example, a one-way or multi-way valve as disclosed, for example, in DE-A-197 18 408. The valve element is used to close or release one or more valve openings.

The valve element is usually activated electrically or electromagnetically. However, within the scope of the invention it is also possible for the valve element to be manually activatable only by means of the manual activation device.

The manual activation device 3 has an activation element 3.1 which is arranged movably in a recess 1.1. The activation element 3.1 is actively connected to the valve element 2 for the manual activation of the valve element 2, there possibly being either direct contact or one or more inter-connected connection means between the activation element 3.1 and the valve element 2. In the embodiment depicted, the active connection is indicated by means of a cylindrical pin 4.

There are further provided means for securing the activation element 3.1 in the recess 1.1 of the valve housing. The securing means are formed by a rigid projection 3.2 and a stop region 1.2 which co-operates with the projection, it being possible to provide the projection fixed to the activation element or fixed to the valve housing and the stop region accordingly fixed vice versa, i.e., to the valve housing or the activation element. In the embodiment illustrated, the lug-like projection 3.2 is located on the activation element 3.1 and the stop region 1.2 in the valve housing in the region of a slot or relief of the recess 1.1. Consequently, the projection 3.2 extends in the peripheral (radial) direction of the activation element 3.1 only over a small portion.

There is further provided, between the recess 1.1 and the activation element 3.1, a sealing element 5 which is advantageously in the form of an O-ring. Instead of an O-ring, the sealing element 5 could also be formed by another resilient seal, for example, a local rubber coating vulcanized on the activation element. The sealing element 5 is so resilient that the activation element 3.1 can be introduced eccentrically into the recess 1.1 during assembly and is automatically centered in the recess in the introduced state (after the assembly). As is apparent in particular from FIGS. 1 and 2, the recess 1.1 is in the form of a drilled receiving hole and the activation element 3.1 accordingly pin-shaped. The projection 3.2 is provided on the outer peripheral face of the activation element 3.1, the diameter of the activation element 3.1 in the region of the projection 3.2 being equal to or smaller than the diameter of the drilled receiving hole. The introduction of the activation element 3.1 during assembly is promoted by the lug-like form of the projection 3.2 and a drilled receiving hole which is, if necessary, chamfered additionally.

In the embodiment depicted, the sealing element 5 is provided in a corresponding peripheral slot of the activation element 3.1. Alternatively, however, the sealing element 5 could also be arranged in a corresponding peripheral slot in the recess 1.1. During assembly, the sealing element 5.1 is compressed more strongly at the region of the activation element 3.1 that is opposite to the projection 3.2. The resilience of the sealing element must be calculated so that, on the one hand, it is possible to introduce the activation element 3.1 owing to the different deformation over the periphery of the sealing element and, on the other hand, the activation element 3.1 is automatically centered in the recess 1.1 in the assembled state according to FIG. 2 and is thereby concentrically aligned in the drilled receiving hole.

Consequently, the sealing element 5 is used not only to seal the system pressure present in the valve housing relative to the ambient pressure, but also has the function of ensuring the introduction and subsequent centering of the activation element.

Figure 2:
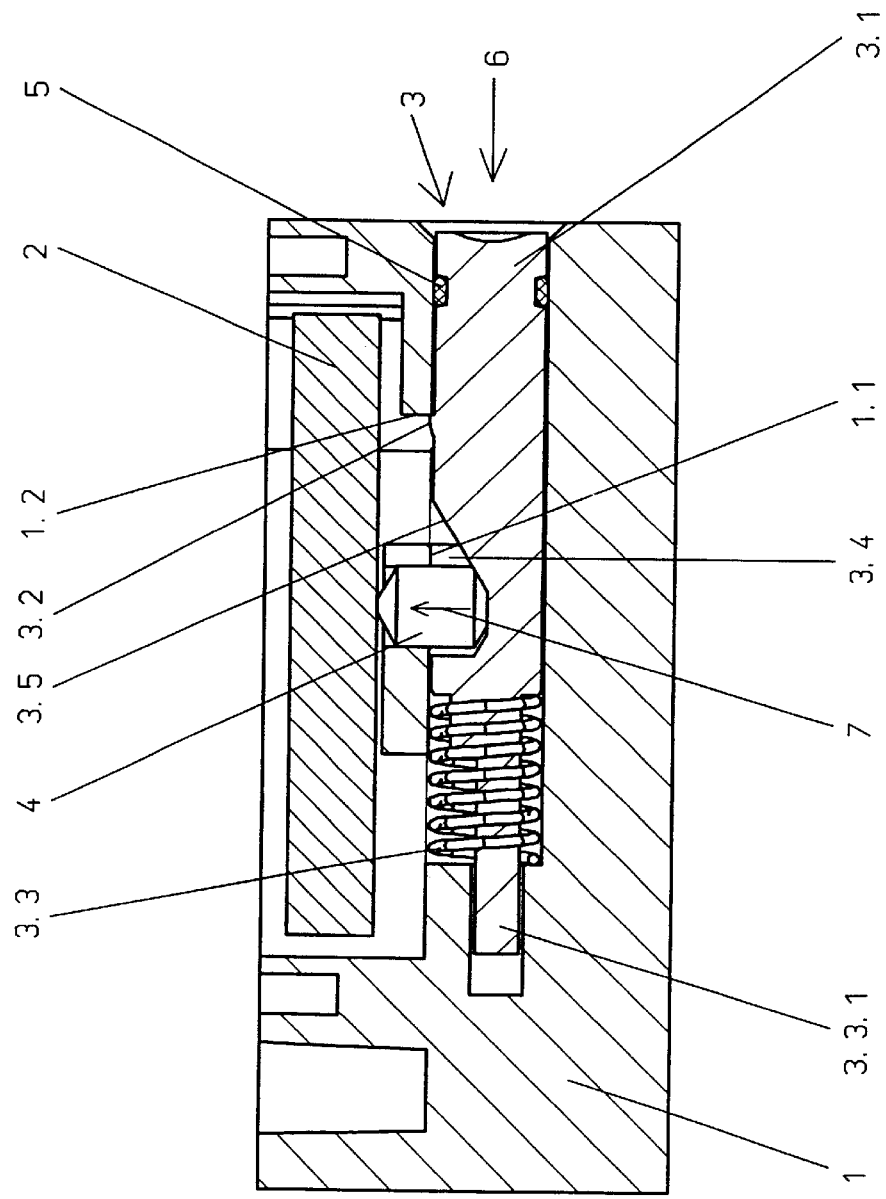
FIG. 2 is a section of the valve in the region of the activation device in the assembled state.

The activation device 3 further provides a spring element 3.3 which acts on the activation element 3.1 in such a manner that, when the activation element 3.1 is not activated, the projection 3.2 is pressed against the stop region 1.2 (see FIG. 2).

The activation element 3.1 has at one end an end region 3.3.1 of relatively small diameter so that the spring element 3.3 in that region can be pushed onto the activation element 3.1. The activation element 3.1 is then also pushed into the recess 1.1 with that end region first.

In an advantageous embodiment of the invention, the recess 1.1 has a first region 1.1.1 of a first diameter and a second region 1.1.2 of a second, smaller, diameter, the activation element 3.1, with its end region of a smaller diameter, being received and supported in the second region 1.1.2 of the recess.

As can be seen in particular in FIG. 2, the spring element 3.3 is consequently supported, on the one hand, on the housing and, on the other, on the activation element 3.1. The lug (rigid projection) 3.2, which comes into contact with the stop region 1.2, prevents the activation element from being pressed out from the recess 1.1 by the pressure of the prestressed spring element 3.3, on the one hand, and by the pressure of the system pressure, on the other.

The manual activation of the valve element 2 can be effected either by axial displacement of the activation element 3.1 or by a twisting movement thereof. In the embodiment illustrated, the activation element 3.1 can be activated axially, that is, in the direction of arrow 6 (see FIG. 3).

The active connection between the activation element 3.1 and the valve element 2 can be released in many different manners depending on the local circumstances. For instance, the activation element 3.1 can at one end, for example, be directly in contact with the valve element, wherein it would be possible for the manual activation of the valve element to be effected by pressing or rotating the opposite end.

In the embodiment illustrated, the activation element 3.1 provides a relief 3.4 which in turn has an inclined face 3.5. A cylindrical pin 4 projects into that relief 3.4 and is actively connected directly or indirectly to the valve element 2. By activating the activation element 3.1 in the direction of arrow 6, the inclined face 3.5 comes into contact with the cylindrical pin 4 and displaces it in the direction of arrow 7.

Figure 3:
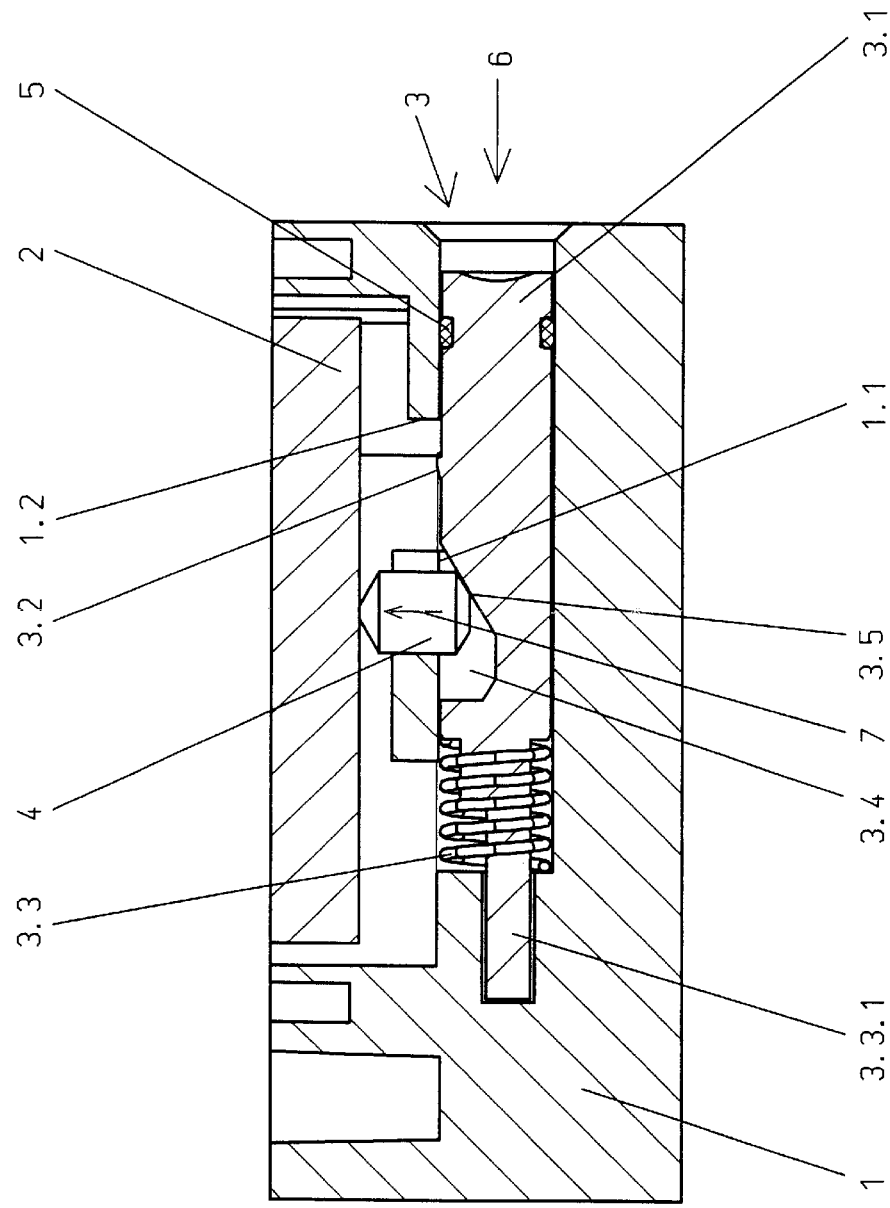
FIG. 3 is a section of the valve in the region of the activation device in the activated state.

Such an activated state is shown in FIG. 3 where the activation element 3.1 is further displaced from the state of FIG. 2 in the direction of arrow 6 while compressing the spring 3.3. Thus, the relief 3.4 having the inclined surface 3.5 moves toward the left of FIGS. 2 and 3, which shifts the cylindrical pin 4 upwardly, thereby driving the valve element 2.

As soon as the external activation pressure in the direction of arrow 6 on the activation element 3.1 is brought to an end, the activation element 3.1 is displaced by the spring 3.3 back in the opposite direction until the projection 3.2 comes into contact with the stop region 1.2. That in turn results in the cylindrical pin 4 again being pushed into the relief 3.4.

The above-described manual activation device requires a particularly small constructional space which substantially corresponds to the drilled receiving hole for the activation element 3.1. Therefore, the manual activation device is particularly suitable for valves of very small dimensions.

The activation element itself is advantageously of a plastics material and could be produced with a diameter of less than 2 mm. It is also possible to produce the lug-like projection 3.2 particularly readily using the plastics injection molding process. The activation element simply has to be pushed into the recess 1.1 when the activation device is assembled. There is no need for an additional securing means owing to the automatic centering of the activation element by the sealing element.

What is claimed is:

1. A valve comprising:
    a valve element arranged in a valve housing;
    a manual activation device which has an activation element, the activation element being arranged movably in a recess of the valve housing and actively connected to the valve element for manual activation of the valve element; and
    means for securing the activation element in the recess of the valve housing;
    wherein the securing means is formed by a rigid projection and a stop region which co-operates with the projection, the rigid projection being radially projected relative to an axis of the activation element, and wherein the rigid projection is integrally formed on the activation element while the stop region is formed on the valve housing or the rigid projection is integrally formed on the valve housing while the stop region is formed on the activation element; and
    wherein there is provided, between the recess and the activation element, a sealing element which is of such resilient form that the activation element can be introduced eccentrically into the recess during assembly and is automatically centered in the recess after the assembly.

2. A valve according to claim 1, wherein the rigid projection is lug-like.

3. A valve according to claim 1, wherein the rigid projection is provided on the activation element.

4. A valve according to claim 1, wherein the recess is in the form of a drilled receiving hole and the activation element is pin-shaped, the projection being provided on the outer peripheral face of the activation element and the diameter of the activation element in the region of the projection being equal to or smaller than the diameter of the drilled receiving hole.

5. A valve according to claim 1, wherein the stop region is formed in a relief of the recess or in a relief of the activation element.

6. A valve according to claim 1, further comprising a spring element in the recess and acts on the activation element in such a manner that the projection is pressed against the stop region when the activation element is not activated.

7. A valve according to claim 1, wherein the activation element has means for transferring the movement of the activation element to the valve element.

8. A valve according to claim 1, wherein the activation element has means for transferring the movement of the activation element to the valve element, the transferring means including an inclined face on the activation element.

9. A valve according to claim 1, wherein the activation element is arranged movably in an axial direction for the manual activation of the valve element.

10. A valve according to claim 1, wherein the activation element is arranged in a rotationally movable manner for the manual activation of the valve element.

11. A valve according to claim 1, wherein the activation element is arranged to be displaced axially inwards counter to the pressure of a spring element.

12. A valve according to claim 1, wherein the activation element is pin-shaped and, at one end, is activatable from the exterior and, at the other end, has an end region of smaller diameter onto which a spring element is pushed.

13. A valve according to claim 1, wherein the activation element is pin-shaped and, at one end, is activatable from the exterior and, at the other end, has an end region of smaller diameter onto which a spring element is pushed and, the recess is in the form of a drilled receiving hole, the drilled receiving hole having a first region of a first diameter and a second region of a second, smaller, diameter, and the activation element being received and supported, at its end region of smaller diameter, in the second region of the drilled receiving hole.

14. A valve according to claim 1, further comprising a sealing element in the form of an O-ring.

* * * * *